B. F. WHEELER.
Sleigh Brake.
No. 80,256.
Patented July 21, 1868.
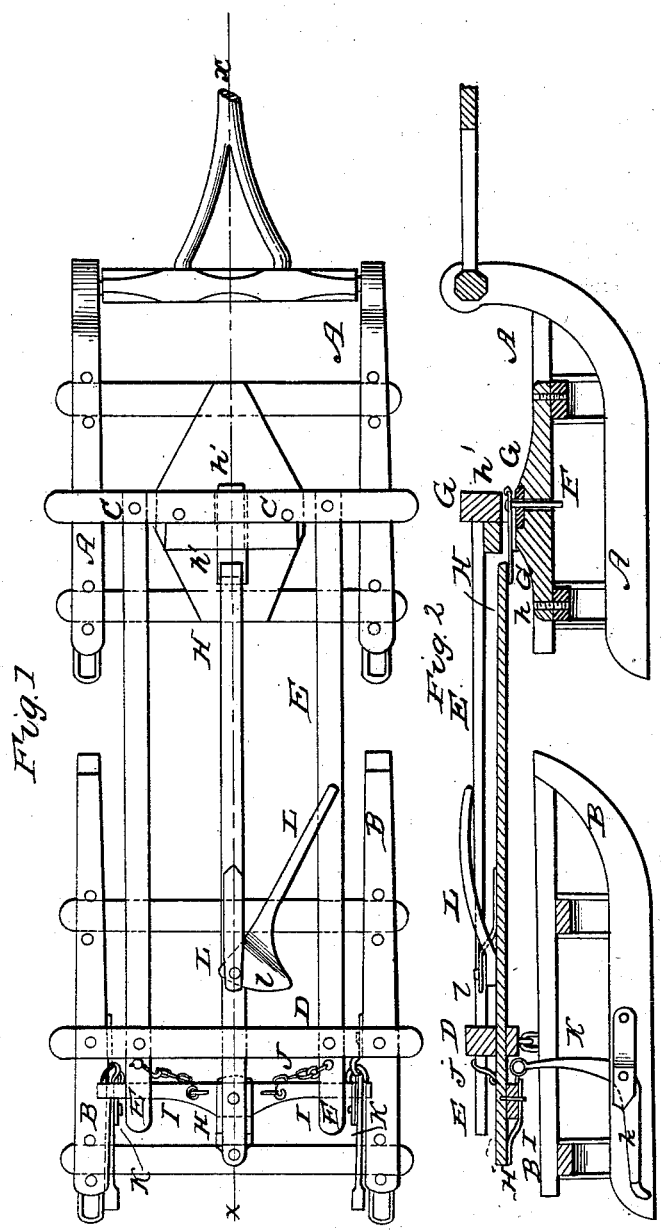

United States Patent Office.

BENJAMIN F. WHEELER, OF CALAIS, VERMONT.

Letters Patent No. 80,256, dated July 21, 1868.

IMPROVEMENT IN SLEIGH-BRAKES.

The Schedule referred to in these Letters Patent and making part of the same.

TO ALL WHOM IT MAY CONCERN:

Be it known that I, BENJAMIN F. WHEELER, of Calais, in the county of Washington, and State of Vermont, have invented a new and useful Improvement in Sleigh-Brakes; and I do hereby declare that the following is a full, clear, and exact description thereof, which will enable others skilled in the art to make and use the same, reference being had to the accompanying drawings, forming a part of this specification.

Figure 1 is a top view of a bob-sleigh, to which my improved brake has been attached.

Figure 2 is a longitudinal section of the same, taken through the line $x\ x$, fig. 1.

Similar letters of reference indicate corresponding parts.

My invention has for its object to furnish an improved sleigh-brake, which shall be so constructed and arranged that the horses, in holding back, may apply the brake with a force proportioned to the forward pressure of the load, and which may be easily adjusted to allow the sleigh to be backed without applying the brake; and it consists in the construction and combination of the various parts, as hereinafter more fully described.

A is the forward, and B is the rearward bob of the sleigh.

C is the forward, and D is the rear bolster, which are rigidly connected to each other by the longitudinal side-bars E.

The rear bolster, D, is connected to the rear bob, B, by eye-bolts or equivalent connections, so that the bolster-frame may remain in a horizontal position, however the bob B may incline in passing over rough roads.

The forward bolster, C, is connected to the forward bob, A, by the king-bolt F, which passes through a slot in the plate G, attached to the under side of the bolster C, so that the bob A may move forward and back beneath the said bolster the length of the said slot.

H is the reach or connecting-bar, to the forward end of which is attached a bar or strap, $h'$, which passes into a recess formed in the under side of the bolster C above the plate G, attached to said bolster C, and through the forward end of which the king-bolt F passes, to connect the said bar H to the forward bob A, so that the said bar or reach may be moved forward and back with the movement of the said bob A.

The rear part of the connecting-bar or reach H passes through a hole or recess in the lower part of the rear bolster, D, and to its rear end is pivoted the equal-armed lever I, the movement of which is restricted by the short chains J, connecting the said lever to the rear ends of the side bars E, or to the rear bolster, D.

K are two bent levers, which are pivoted at their angles to the inner sides of the runners of the rear bob, B, and the ends of the upper arms of which are pivoted to the ends of the equal-armed lever I.

The lower arms of the bent levers K, which form the dogs of the brake, extend nearly horizontally along the inner sides of the runners of the rear bob, B, and have hooks or claws formed upon their ends, which, when depressed, take hold of the ground or roadway, and check the advance of the sleigh.

By this construction, as the sleigh begins to go down-hill, the load and rear bob slide forward upon the connecting-bar or reach, which draws the upper ends of the bent-lever dogs K back, depressing their rear or hooked ends with a force proportioned to the forward pressure of the load.

L is a cam-lever, which is pivoted to the connecting-bar or reach H, in such a position that when turned into the position shown in the drawings, the rear bob and bolster-frame may slide forward to operate the brake; but when the lever is moved outward, the cam $l'$, formed upon said lever, may be forced against the rear bolster, D, preventing the forward movement of the said bolster, and consequently the operation of the brake. This allows the sleigh to be backed, when required, without operating the brake.

Having thus described my invention, what I claim as new, and desire to secure by Letters Patent, is—

1. The combination of the bent-lever dogs K, equal-armed lever I, chains J, parallel side-bars E, sliding reach H, and rear bob B, all arranged as described, for the purpose specified.

2. The combination of the short chains J with the equal-armed lever I and side-bars E or bolster D, as herein shown and described and for the purpose set forth.

3. The combination of the cam-lever L with the connecting-bar or reach H, and with the rear bolster D, as herein shown and described and for the purpose set forth.

4. The arrangement of the slotted bolster C D, parallel side-bars E, sliding reach H, metallic plate G, equal-armed lever I, chains J, and bent-lever dogs K, all operating as described, for the purpose specified.

BENJAMIN F. WHEELER.

Witnesses:
ORAMEL N. SMITH,
MAIN MOETRA.